United States Patent
Balint et al.

(10) Patent No.: US 9,940,116 B2
(45) Date of Patent: Apr. 10, 2018

(54) SYSTEM FOR PERFORMING REMOTE SERVICES FOR A TECHNICAL INSTALLATION

(75) Inventors: Thomas Balint, Billigheim (DE); Jörg Bauer, Uttenreuth (DE); Jan Kissling, Graben-Neudorf (DE)

(73) Assignee: SIEMENS AKTIENGESELLCHAFT, Munich (DE)

(*) Notice: Subject to any disclaimer, the term of this patent is extended or adjusted under 35 U.S.C. 154(b) by 46 days.

(21) Appl. No.: 13/521,987

(22) PCT Filed: Jan. 10, 2011

(86) PCT No.: PCT/EP2011/050200
§ 371 (c)(1),
(2), (4) Date: Jul. 12, 2012

(87) PCT Pub. No.: WO2011/086041
PCT Pub. Date: Jul. 21, 2011

(65) Prior Publication Data
US 2013/0139147 A1    May 30, 2013

(30) Foreign Application Priority Data

Jan. 12, 2010   (DE) .......................... 10 2010 000 824

(51) Int. Cl.
G06F 9/445     (2006.01)
H04L 29/06     (2006.01)
H04L 29/08     (2006.01)

(52) U.S. Cl.
CPC ............ G06F 8/61 (2013.01); H04L 63/0272 (2013.01); H04L 63/0478 (2013.01);
(Continued)

(58) Field of Classification Search
None
See application file for complete search history.

(56) References Cited

U.S. PATENT DOCUMENTS

| | | | |
|---|---|---|---|
| 6,501,996 B1 | 12/2002 | Bieber | 700/19 |
| 6,529,780 B1 | 3/2003 | Soergel et al. | 700/10 |
| 7,162,510 B2 | 1/2007 | Jammes et al. | 709/203 |
| 7,310,669 B2 * | 12/2007 | Webb et al. | 709/224 |
| 7,389,534 B1 | 6/2008 | He | 726/15 |

(Continued)

FOREIGN PATENT DOCUMENTS

| | | | | |
|---|---|---|---|---|
| CN | 1703047 A | 11/2005 | | H04L 12/56 |
| CN | 101022359 A | 8/2007 | | H04L 12/24 |

(Continued)

OTHER PUBLICATIONS

Zezulka, Frantisek et al., "Virtual Automation Networks—Architectural Principles and the Current State of Development," IEEE Conference Proceedings Articles, XP031410670, 6 pages, 2008.

(Continued)

*Primary Examiner* — Wynuel Aquino
(74) *Attorney, Agent, or Firm* — Slayden Grubert Beard PLLC

(57) ABSTRACT

A system is provided for performing remote services for a technical installation comprising a first remote service system having a first tunnel connection for transmitting data between a first device at a distance from the installation and a first device internal to the installation, and a second remote service system having a second tunnel connection for transmitting data between a second device at a distance from the installation and a second device internal to the installation, wherein the second tunnel connection runs through the first tunnel connection. Performing a plurality of remote services in an installation can thereby be enabled at a high level of IT security and a high level of operational reliability of the installation, wherein the administrative effort on the part of the installation operator call be kept small.

12 Claims, 1 Drawing Sheet

(52) U.S. Cl.
CPC ........ *H04L 67/125* (2013.01); *H04L 63/0209* (2013.01); *H04L 63/0464* (2013.01)

(56) References Cited

U.S. PATENT DOCUMENTS

| | | | | |
|---|---|---|---|---|
| 7,447,901 | B1* | 11/2008 | Sullenberger et al. | 713/153 |
| 7,530,113 | B2 | 5/2009 | Braun et al. | 726/28 |
| 7,613,593 | B2 | 11/2009 | Mikk | 703/1 |
| 7,685,316 | B2* | 3/2010 | Sukumaran | 709/246 |
| 8,190,284 | B1 | 5/2012 | Herbst et al. | 700/108 |
| 8,214,455 | B2 | 7/2012 | Baier et al. | 709/217 |
| 8,510,812 | B2 | 8/2013 | Krywaniuk | 726/6 |
| 8,868,757 | B1* | 10/2014 | Liu | H04L 63/0281 709/220 |
| 2002/0007348 | A1 | 1/2002 | Ali et al. | 705/51 |
| 2004/0053601 | A1 | 3/2004 | Frank et al. | 455/411 |
| 2005/0265366 | A1 | 12/2005 | Ejiri | 370/401 |
| 2006/0089977 | A1 | 4/2006 | Cramer et al. | 709/218 |
| 2007/0143837 | A1 | 6/2007 | Azeez et al. | 726/11 |
| 2008/0192739 | A1 | 8/2008 | Carrasco et al. | 370/389 |
| 2009/0043145 | A1 | 2/2009 | Rouleau et al. | 585/739 |
| 2009/0316713 | A1 | 12/2009 | Miyabe | 370/412 |
| 2010/0135287 | A1* | 6/2010 | Hosain et al. | 370/389 |
| 2012/0290105 | A1 | 11/2012 | Balint et al. | 700/73 |

FOREIGN PATENT DOCUMENTS

| | | | | |
|---|---|---|---|---|
| DE | 10331309 A1 | 2/2005 | ............ | H04L 29/06 |
| EP | 1912381 A1 | 4/2008 | ............ | H04L 12/24 |
| WO | 2007/070154 A2 | 6/2007 | ............ | G06F 15/16 |
| WO | 2011/086041 A1 | 7/2011 | ............ | H04L 12/46 |
| WO | 2011/086083 A2 | 7/2011 | | |

OTHER PUBLICATIONS

Lopez, José "Secure M2M Communication with JMC Conciliator," Research Disclosure, Kenneth Mason Publications, 10 pages, Nov. 2009.

German Office Action, Application No. 10 2010 000824.9-31, 4 pages, Oct. 29, 2010.

International Search Report and Written Opinion, Application No. PCT/EP2011/050200, 16 pages, May 13, 2011.

International Search Report and Written Opinion, Application No. PCT/EP2011/050307, 12 pages, Feb. 6, 2012.

Chinese Office Action, Application No. 2011800059512, 13 pages, Apr. 30, 2014.

Chinese Office Action, Application No. 2011800059508, 11 pages, Jul. 2, 2014.

* cited by examiner

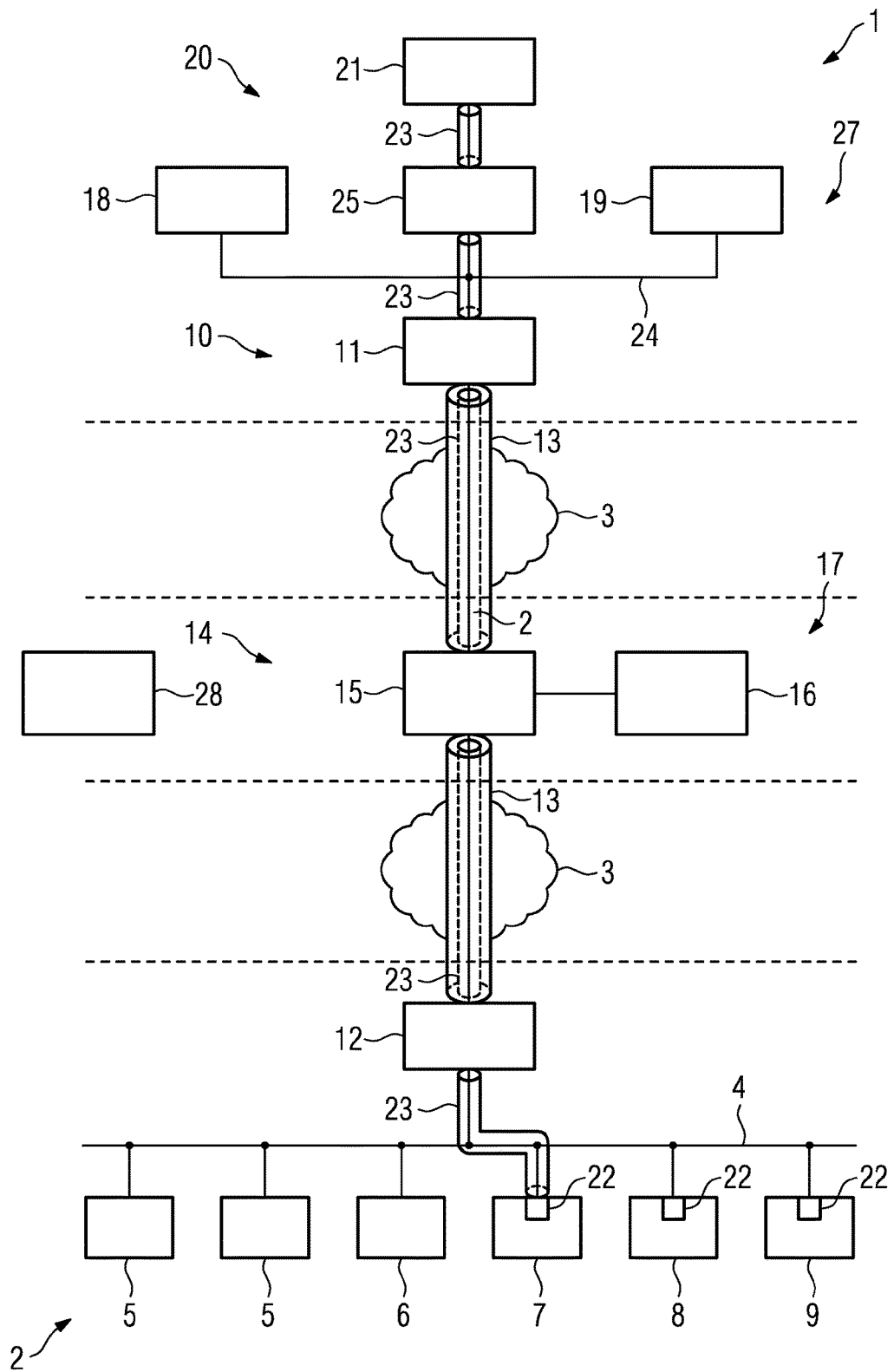

SYSTEM FOR PERFORMING REMOTE SERVICES FOR A TECHNICAL INSTALLATION

CROSS-REFERENCE TO RELATED APPLICATIONS

This application is a U.S. National Stage Application of International Application No. PCT/EP2011/050200 filed Jan. 10, 2011, which designates the United States of America, and claims priority to DE Patent Application No. 10 2010 000 824.9 filed Jan. 12, 2010. The contents of which are hereby incorporated by reference in their entirety.

TECHNICAL FIELD

This disclosure relates to a system for performing remote services for a technical installation

BACKGROUND

Remote services offer a plurality of possible applications in the lifecycle of the technical installation (e.g. of an industrial production installation, a power station, a freight transport and distribution system or buildings technology in a large building). This includes for example remote update services, remote conditioning monitoring, remote maintenance and last but not least remote support for fault clearance.

To enable these services to be provided a communication link via a public network (e.g. the Internet) into the installation is needed, usually into a non-public internal network of the installation. Particular security requirements are imposed on the internal networks in such installations. From the IT standpoint these are verifiability, transparency and IT security, from the standpoint of the operational sequence this is the operational security of the installation.

The connection from outside via the public network into the internal non-public network of the installation is therefore frequently made through what is referred to as a "tunnel connection". A tunnel connection in this case is to be understood as a communication link between a device remote from the installation via a public and thus non-secure network such as the Internet for example to a device within the installation, for which an identification and authentication of the communication partners is undertaken and for which through data encryption the confidentiality of the data (i.e. there is no access to the data to third parties) as well as the integrity of the data (i.e. no modification of the data by third parties is possible) is guaranteed. Such a tunnel connection is possible via the Internet for example by a VPN (Virtual Private Network) connection, which uses an Internet security protocol such as IPsec (Internet Protocol Security) for example. In this case, although the IT security is sufficient, verifiability and transparency of the connection is not provided or only provided to a certain extent.

If a number of different remote services are performed for an installation, these are realized by correspondingly numerous and mostly different secure tunnel connections into the installation. These numerous connections entail a high administration outlay for the operator of the installation, in order to guarantee a minimum amount of security, especially in relation to transparency and verifiability. For this reason installation operators wish to have the fewest possible connections of this type and are thus skeptical about new remote services.

SUMMARY

In one embodiment, a system for performing remote services for a technical installation comprises: a first remote services system with a first device remote from the installation for performing a first remote service, a first device within the installation and a first tunnel connection for transmission of data between the first device remote from the installation and the first device within the installation, and a second remote services system with a second device remote from the installation for performing a second remote service, a second device within the installation and a second tunnel connection for transmission of data between the second device remote from the installation and the second device within the installation, wherein the second tunnel connection runs through the first tunnel connection.

In a further embodiment, the first tunnel connection is made via a secure communication platform which is linked to the Internet. In a further embodiment, the secure communication platform is located in a demilitarized zone. In a further embodiment, data mirroring takes place on the secure communication platform. In a further embodiment, the first tunnel connection uses a different data encryption from the second tunnel connection. In a further embodiment, the two remote services systems are linked to a common authentication entity.

BRIEF DESCRIPTION OF THE DRAWINGS

An example embodiment is explained in more detail below with reference to FIG. 1, which shows an example system for performing remote services for a technical installation, according to an example embodiment.

DETAILED DESCRIPTION

Some embodiments provide a system for performing remote services for a technical installation with high IT security and high operational installation security, which may reduce the administration outlay on the part of the installation operator and thus make it possible to perform a plurality of remote services in an installation.

In one embodiment, a system for performing remote services for a technical installation may comprise:
  a first remote services system with a first device remote from the installation for performing a first remote service, a first device within the installation and a first tunnel connection for transmission of data between the first device remote from the installation and the first device within the installation, and
  a second remote services system with a second device remote from the installation for performing a second remote service, a second device within the installation and a second tunnel connection for transmission of data between the second device remote from the installation and the second device within the installation.

In this embodiment, the second tunnel connection may run through the first tunnel connection.

The data connection to the second device within the installation is thus made metaphorically by a "double tunnel connection" or a "tunnel in a tunnel". Thus only the first tunnel connection from outside into the installation is physically necessary, via which in its turn the second tunnel connection then runs. For the installation operator this essentially produces only one administration outlay for the first tunnel connection and thus only for a single tunnel connection instead of the two tunnel connections. The first tunnel connection in this case can be embodied especially securely, so even the comparatively less secure second tunnel connection can be raised to the security level of the first tunnel connection. This also enables high operational security of the installation to be achieved. Even more tunnel connections of further remote services systems can run through the first tunnel connection, without the administrative outlay on the part of the installation operator significantly increasing and the operational security being restricted. The first remote services system is used, from the standpoint of the second and if necessary further remote services systems, basically as a transport infrastructure and realizes a secure connection of installation components to a second and if necessary further remote services provider(s). The protocols of the second remote services system and if necessary the further remote services systems can be exchanged via this infrastructure. In the view of the installation operator one single integrated remote services solution is involved.

In accordance with another embodiment the first tunnel connection is made via a secure communication platform which is connected to the Internet. This enables a tunnel connection into the installation to be established from any Internet connection worldwide.

To increase the security the secure communication platform may be located in a demilitarized zone.

In accordance with another embodiment, there is data mirroring on the secure communication platform for further increasing the security.

The first tunnel connection may use a different data encryption from the second tunnel connection.

So that a user of the second remote services system does not have to authenticate themselves both with the first and also with the second remote services system, but only once with one of the two remote services systems, the two remote services systems can be connected to a shared authentication entity.

The sole FIGURE shows an example system 1 for performing remote services for a technical installation 2 (e.g. an industrial production installation, a power station, a freight transport and distribution installation or the buildings technology in a large building), which comprises a first remote services system 10 and a second remote services system 20, according to an example embodiment. It is assumed below that the two remote services systems 10, 20 are used by the same remote services provider for performing remote services. This is only by way of example however. Accordingly the two remote services systems 10, 20 can also be used by different remote services providers for performing remote services.

The first remote services system 10 comprises a device remote from the installation 2 in the form of an access router 11, a device within the installation in the form of an access router 12 and a secure communication platform 14, which comprises an access server 15 and a data server 16 and which is located in a demilitarized zone 17 of the Internet 3. The access router 12 is connected to an internal non-public network 4 of the installation, to which for example components 5 of an automation system of the installation 2 and a Computerized Maintenance Management System (CMMS) 6 of the installation 2 are also connected. The access router 11 is located in a demilitarized zone 27 of the remote services provider and is connected to an internal non-public network 24 (e.g. an Intranet) of the remote services provider.

A tunnel connection 13 through the Internet 3 is able to be established between the access router 11 and the access router 12 with the aid of the secure communication platform 14. Data of the system 2, e.g. data about a manufacturing process, from the automation devices 5 or the CMMS system 6 can be transmitted via the tunnel connection 13 to the remote services provider and conversely data of the remote services provider can be transmitted to these components. The data in such cases can be transmitted automatically or on explicit request by the remote services provider.

The tunnel connection 13 is in this case not "through connected" in the secure communication platform 14 but is interrupted in the access server 15 by a "reverse-proxy" functionality. A connection setup from the installation 2 via the access router 12 or from the remote services provider by the access router 11 is terminated in the access server 15.

The data transmitted in this case is stored in the data server 16. The access server 15 then establishes the further connection to the remote services provider or to the installation 2 and transmits the data stored in the data server 16 over said connection.

The incoming communication is thus "mirrored" in the secure communication platform 14. However this mirroring only occurs for predefined protocols. This ensures that communication between the remote services provider and the installation 2 only takes place via explicitly allowed protocols. The said mirroring and the connection setup to the installation 2 or to the remote services provider is undertaken exclusively after successful authentication and authorization at the respective access router 11 or 12, wherein the connection information and passwords needed for this are transmitted securely.

This architecture offers reliable protection against non-authorized accesses into the installation via the remote services provided and vice versa, against access from the Internet, against transmission of viruses and similar damaging programs from the remote services providers into the installation and vice versa, as well as against misuse of confidential access data.

The IPSec protocol may be used to ensure confidentiality, authenticity and integrity of communication via the tunnel connection. The IPSec end points are then located in routers 11, 12. The Internet Security Association and Key Management Protocol (ISAKMP) can be used to exchange key information.

The tunnel connection 13 may involve a VPN (Virtual Private Network) tunnel connection, i.e. the routers 11 and 12 are embodied as VPN routers with broadband Internet access. This makes high bandwidths available at very low communication costs for powerful remote services and also for future value-added services.

The access router 12 checks the authorization of the remote services provider for access to the installation 2. If access is authorized it transfers to the remote services provider a temporary password for access to the access server 15. The access router 11 conveys access data and the temporary password to the access server 15. The remote services provider applies to the access server 15 for access to the installation 2 by specifying their password. The access server 15 compares the password with the password obtained from the access router 12 and, in the event of a match, establishes the tunnel connection 13 of the remote services provider to the installation 2. The access router 12 can in this case also be set so that it only allows connections from the installation 2 to the secure communications platform 14.

The first remote services system 10 offers the opportunity, through data communication with the automation components 5 or the CMMS system 6, of executing remote services such as remote monitoring, remote diagnosis or software updates in the automation devices 5 or the CMMS system 6 of the installation 2. For this purpose the remote services provider can access the automation components 5 and the CMMS 6 via an engineering station 18 or a remote service PC 19 connected to his internal network 24 via the tunnel connection 13. The first remote services system 10 has its strengths however above all in the reliable and secure data transmission via the tunnel connection 13.

The second remote services system 20 comprises a server 25 remote from the installation which, like the access router 11 of the first remote services system 10, is connected to the non-public network 24 of the remote services provider, and a client PC 21 which is linked to the server 25.

Services are provided by the remote services system 20 which are available for example in the installation 2 at a CNC controller 7, a controller 8 of the basic automation system or a standard PC 9, which are connected to the network 4 and via this has a connection to the access router 12. The CNC controller 7, the controller 8 of the basic automation system and the standard PC 9 each have a software agent 22 for this purpose which forms a component of the remote services system 20 within the installation. In addition further components can be linked to the remote services system 20, such as controllers of the process automation system, MES systems, CMMS systems.

A tunnel connection 23 is able to be established between a software agent 22, here the software agent of the CNC controller 7 and the client PC 21, via which data is able to be transferred from the remote services provider to the software agent 22 of the CNC controller 7 and vice versa. The encryption of the data on the tunnel connection 23 is undertaken in such cases with SSL and thus with a different encryption technology than in the case of the tunnel connection 13. In such cases a protocol, such as the https protocol is used for example which allows the use of a proxy in the connection 23.

The tunnel connection 23 runs in this case in the tunnel connection 13 of the first remote services system 10. Thus physically only the tunnel connection 13 and thus only a single tunnel connection is present from outside into the installation 2. From the viewpoint of the system provider the two remote services systems 10, 20 thus form a single integrated remote services solution. For the installation operator this essentially produces only one administration outlay for the first tunnel connection 13. If this is embodied more securely than the second tunnel connection 23, the second tunnel connection 23 can also be raised to the security level of the first tunnel connection 13. In addition further tunnel connections of further remote services systems can run through the first tunnel connection 13.

The second remote services system 20 has its strengths above all in the provision of added-value services, for example for OEM customers of automation products. The following remote services are offered for these products for example:

Remote monitoring of control devices with recording of events in history with documentation of the current state of the controller at this point in time. The event history makes it possible for example to analyze the state of the controller, in the event of an error for example and compare it with earlier states.

State monitoring: detection and documentation of the current machine state based on predefined standardized tests and continuous recording of characteristic state variables. Trends can be detected with the aid of a series of measurements in order to use these as a basis for optimization of the maintenance and service activities. A machine operator can then execute these predefined tests simply and quickly without additional equipment.

Remote access to control devices in the installation

Data services: Saving current controller archives on the server of the remote service provider, with the option to copy these back under controlled conditions onto the controller or use them as reference the comparisons.

Workflow services: Initiation of service and maintenance sequences through notification via internal and external media (SMS, E mail, service events). Planning, monitoring and documentation of maintenance activities at the machine.

Administrative services: Functions for administration of the systems such as for example commissioning and managing machines, commissioning and managing users.

So that a user of the second remote services system 20 does not have to authenticate themselves at the second remote services system 20 and also at the first remote services system 10, i.e. twice, a common authentication mechanism can be present. This is typically made possible by a common authentication entity 28 being provided which, in a manner not shown here, is linked to the two remote services systems 10, 20. A user then only has to log on once and can thereafter switch between the two remote services systems 10, 20.

The installation 2 or its network 4, the secure platform 14 and the network 24 of the remote services provider are protected in this case against unauthorized access from the Internet 3 by firewalls not shown in any greater detail.

What is claimed is:

1. A system for performing remote services for a technical installation comprising one or more installation components, each comprising a device or service of the installation, the system comprising:
    a first remote services system comprising:
        a first device remote from the installation for performing a first remote service,
        a first device within the installation, and
        a first virtual tunnel connection for transmission of data between the first device remote from the installation and the first device within the installation, the first virtual tunnel connection beginning at a first remote endpoint in the first remote services system and terminating at a first installation endpoint within the installation, and
    a second remote services system comprising:
        a second device remote from the installation for performing a second remote service,
        a second device within the installation, and
        a second virtual tunnel connection for transmission of data between the second device remote from the installation and the second device within the installation, the second virtual tunnel connection beginning at a second remote endpoint in the second remote services system and terminating at a second installation endpoint within the installation, wherein the second remote endpoint is separate from the first remote endpoint and the second installation endpoint is separate from the first installation endpoint,
    wherein the first and second virtual tunnel connections share a common physical connection via a secure communication platform connected between the first remote services system and the second remote services system, the secure communication platform being linked to the Internet, wherein the secure communication platform is programmed to:

receive a communication from one of a particular installation component or the first remote services system, the communication including first data intended for the other one of the particular installation component or the first remote services system, store the first data in a data server of the secure communication platform, establish an authenticated connection with the other one of the particular installation component or the first remote services system, and only after establishing the authenticated connection, transmitting the stored first data to the other one of the particular installation component or the first remote services system via the first virtual tunnel connection, and performing a function at the particular installation component or at the first remote services based on the first data, wherein the first virtual tunnel connection uses a first data encryption technology for communications between the first device remote from the installation and the first device within the installation, and the second virtual tunnel connection uses a second data encryption technology different from the first data encryption technology for communications between the second device remote from the installation and the second device within the installation, such that communications between the first device remote from the installation and the first device within the installation are encrypted differently than communications between the second device remote from the installation and the second device within the installation, and wherein the second virtual tunnel connection runs through the first virtual tunnel connection.

2. The system of claim 1, wherein the secure communication platform is located in a demilitarized zone.

3. The system of claim 1, wherein the first remote services system and the second remote services system are linked to a common authentication entity.

4. The system of claim 1, further comprising a router and a controller, each within the installation, wherein the router is the first installation endpoint and the controller is the installation second endpoint.

5. The system of claim 1, wherein the first remote endpoint corresponds with the first device, and the second remote endpoint corresponds with the second device.

6. A system for performing remote services for a technical installation comprising one or more installation components, each comprising a device or service of the installation, the system comprising:

a first virtual tunnel connection for transmitting data between (a) a first device remote from the installation for performing a first remote service and (b) a first device within the installation, the first virtual tunnel connection beginning at a first remote endpoint in the first remote services system and terminating at a first installation endpoint within the installation, and a second virtual tunnel connection for transmitting data between (a) a second device remote from the installation for performing a second remote service and (b) a second device within the installation, the second virtual tunnel connection beginning at a second remote endpoint in the second remote services system and terminating at a second installation endpoint within the installation, wherein the second remote endpoint is separate from the first remote endpoint and the second installation endpoint is separate from the first installation endpoint wherein the first and second virtual tunnel connections share a common physical connection via a secure communication platform connected between the first remote services system and the second remote services system, the secure communication platform being linked to the Internet, wherein the secure communication platform is programmed to:

receive a communication from one of a particular installation component or the first remote services system, the communication including first data intended for the other one of the particular installation component or the first remote services system, store the first data in a data server of the secure communication platform, establish an authenticated connection with the other one of the particular installation component or the first remote services system, and only after establishing the authenticated connection, transmitting the stored first data to the other one of the particular installation component or the first remote services system via the first virtual tunnel connection, and performing a function at the particular installation component or at the first remote services based on the first data, wherein the first virtual tunnel connection uses a first data encryption technology for communications between the first device remote from the installation and the first device within the installation, and the second virtual tunnel connection uses a second data encryption technology different from the first data encryption technology for communications between the second device remote from the installation and the second device within the installation, such that communications between the first device remote from the installation and the first device within the installation are encrypted differently than communications between the second device remote from the installation and the second device within the installation, and wherein the second virtual tunnel connection runs through the first virtual tunnel connection.

7. The system of claim 6, wherein the secure communication platform is located in a demilitarized zone.

8. The system of claim 6, wherein the two remote service are linked to a common authentication entity.

9. The system of claim 6, wherein the first installation endpoint is a router within the installation and the second installation endpoint is a controller within the installation.

10. A method for providing remote services for a technical installation comprising one or more installation components, each comprising a device or service of the installation, the method comprising:

transmitting first data via a first virtual tunnel connection between (a) a first device remote from the installation for performing a first remote service and (b) a first device within the installation, the first virtual tunnel connection beginning at a first remote endpoint in the first remote services system and terminating at a first installation endpoint within the installation transmitting second data via a second virtual tunnel connection between (a) a second device remote from the installation for performing a second remote service and (b) a second device within the installation, the second virtual tunnel connection beginning at a second remote endpoint in the second remote services system and terminating at a second installation endpoint within the installation, wherein the second remote endpoint is separate from the first remote endpoint and the second installation endpoint is separate from the first installation endpoint wherein the first and second virtual tunnel connections share a common physical connection via a secure communication platform connected between the first remote services system and the second remote services system, the secure communication platform being linked to the Internet, receiving, at the secure communication platform, a communication from one of a particular installation component or the first remote services system, the communication including first data intended for the other one of the particular installation component or the first remote services system, storing the first data in a data server of the secure communication platform, establishing, by the secure communication platform, an authenticated connection with the other one of the particular installation component or the first remote services system, and only after establishing the authenticated connection, the secure communication platform transmitting the stored first data to the other one of the particular installation component or the first remote services system via the first virtual tunnel connection, and performing a function at the particular installation component or at the first remote services based on the first data, wherein the first virtual tunnel connection uses a first data encryption technology for communications between the first device remote from the installation and the first device within the installation, and the second virtual tunnel connection uses a second data encryption technology different from the first data encryption technology for communications between the second device remote from the installation and the second device within the installation, such that communications between the first device remote from the installation and the first device within the installation are encrypted differently than communications between the second device remote from the installation and the second device within the installation, and wherein the second virtual tunnel connection runs through the first virtual tunnel connection.

11. The method of claim 10, wherein the secure communication platform is located in a demilitarized zone.

12. The method of claim 10, wherein the first installation endpoint is a router within the installation and the second installation endpoint is a controller within the installation.

* * * * *